United States Patent [19]

Richardson et al.

[11] Patent Number: 5,628,390
[45] Date of Patent: May 13, 1997

[54] METHOD FOR ADAPTIVELY ENGAGING A CLUTCH FOR A MOTOR

[75] Inventors: Roland Richardson, Detroit; Howard W. Krausman, Dexter, both of Mich.

[73] Assignee: Chrysler Corporation, Auburn Hill, Mich.

[21] Appl. No.: 515,074

[22] Filed: Aug. 14, 1995

[51] Int. Cl.$^6$ .................................................. F16D 27/00
[52] U.S. Cl. ..................................... 192/84.1; 192/103 C
[58] Field of Search ........................... 192/84 R, 84 C, 192/40, 52.4, 103 C, 84.1, 84.9, 84.961; 361/139, 143, 152, 154

[56] References Cited

U.S. PATENT DOCUMENTS

| | | | |
|---|---|---|---|
| Re. 33,140 | 1/1990 | Booth | 361/154 |
| 4,376,476 | 3/1983 | Hagiri | 192/84 R |
| 4,567,975 | 2/1986 | Roll | 192/84 C |
| 4,620,261 | 10/1986 | Thornton | 361/154 |
| 4,650,052 | 3/1987 | Okada | 192/84 C |
| 5,094,332 | 3/1992 | Wall | 192/84 R X |

*Primary Examiner*—Richard M. Lorence
*Attorney, Agent, or Firm*—Christopher A. Taravella

[57] ABSTRACT

A method for controlling a clutch for an air conditioner compressor having an armature and a rotor separated by an air gap width powered by an internal combustion engine having a crankshaft includes the steps of receiving a signal to engage the clutch, moving the armature to the rotor over a predetermined time to reduce the air gap width to zero, measuring rotational acceleration of the crankshaft of the internal combustion engine, and changing the predetermined time to reduce the air gap width to zero such that subsequent movement of the armature reduces the changes in the rotational acceleration of the crankshaft.

8 Claims, 4 Drawing Sheets

METHOD FOR ADAPTIVELY ENGAGING A CLUTCH FOR A MOTOR

BACKGROUND OF THE INVENTION

1. Field of the Invention

The present invention relates generally to controlling clutch assemblies and, more particularly, to a method for controlling automotive air conditioning clutch assemblies.

2. Description of the Related Art

The standards for evaluating automotive vehicles are continually becoming more demanding. Perceived drawbacks are just as damaging as real drawbacks. One such perceived drawback is that the automotive vehicle is underpowered. This drawback may be perceived when the air conditioner is turned on. The compressor motor receives its operating power from the internal combustion engine as transmitted through the rotation of one of the continuous belts. The compressor motor, when engaged, creates an additional load which affects the rotational movement of the crankshaft of the internal combustion engine. The perception created by operating the air conditioner is that the engine is not capable of handling the additional load without loss of engine performance. U.S. Pat. No. 4,567,975, issued to Roll on Feb. 4, 1986, discloses an assembly which reduces the noise associated with engaging the clutch of an air conditioning motor in an automotive environment. The assembly creates slippage between the armature and the rotor of the air conditioning motor. After initial contact therebetween, the slippage is one hundred percent. The slippage is slowly reduced to zero percent allowing the motor to become fully operational through full torque coupling between the armature and the rotor. While this system provides a clutch assembly which reduces the perceived drain on engine power, and also reduces the noise associated with engaging the air conditioning clutch, it employs a different technique than that used by the instant invention.

SUMMARY OF THE INVENTION

It is an object of the present invention to provide a method for engaging a clutch of an air conditioning motor in the internal combustion engine of an automotive vehicle without creating an additional load on the internal combustion engine such that the acceleration of the internal combustion engine is reduced to a level perceivable by the occupants of the automotive vehicle.

To achieve the foregoing object, the present invention includes a method for controlling a clutch of a electric motor receiving power from a power source. The clutch includes a rotor and a armature moved to engage the rotor over a predetermined time to reduce the air gap width to zero. Changes in the power source are then measured. The predetermined time is changed in such a manner that the changes in the power source are reduced.

Other objects, features and advantages of the present invention will be readily appreciated as the same becomes better understood by reference to the subsequent description when considered in connection with the accompanying drawings.

DESCRIPTION OF THE PREFERRED EMBODIMENT(s)

Figure 1:
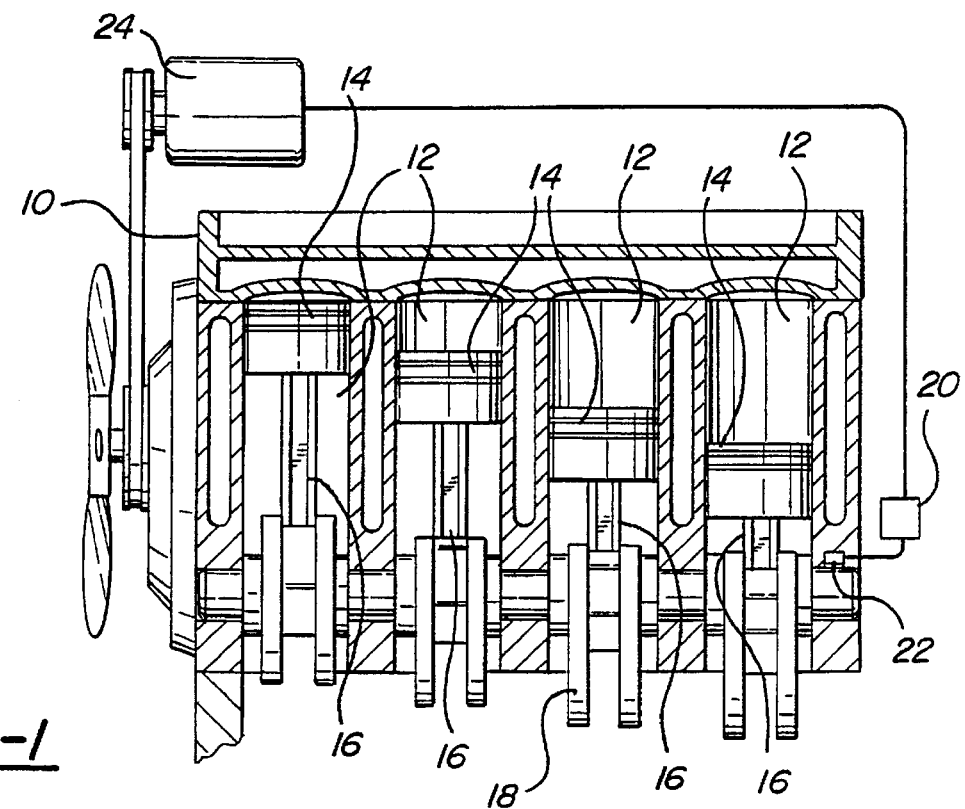
FIG. 1 is a sectional view of an internal combustion engine.

Referring to FIG. 1, a sectional view of an internal combustion engine 10 is shown. The internal combustion engine 10 includes a plurality of cylinders 12 with pistons 14 moving vertically therein. Connecting rods 16 transfer the motion of the pistons 14 to a crankshaft 18 which rotates from the movement of the pistons 14 and the cylinders 12. The rotation of the crankshaft 18 is received by a powertrain (not shown) which eventually is used to power the movement of the automotive vehicle (not shown).

A control unit 20 receives a signal from a sensor 22 and controls an air conditioning motor 24. In one embodiment, a sensor 22 senses the rotational movement of the crankshaft 18. It may be appreciated by those skilled in the art that the sensor 22 may be any sensor which detects a parameter or event created by the internal combustion engine 10. The control unit 20 uses output of the sensor 22 to determine the rotational acceleration of the crankshaft 18. An example of the rotational acceleration of the crankshaft 18 is graphically shown at line 26 in FIG. 3. The control unit 20 may include a microprocessor based circuit.

Figure 2:
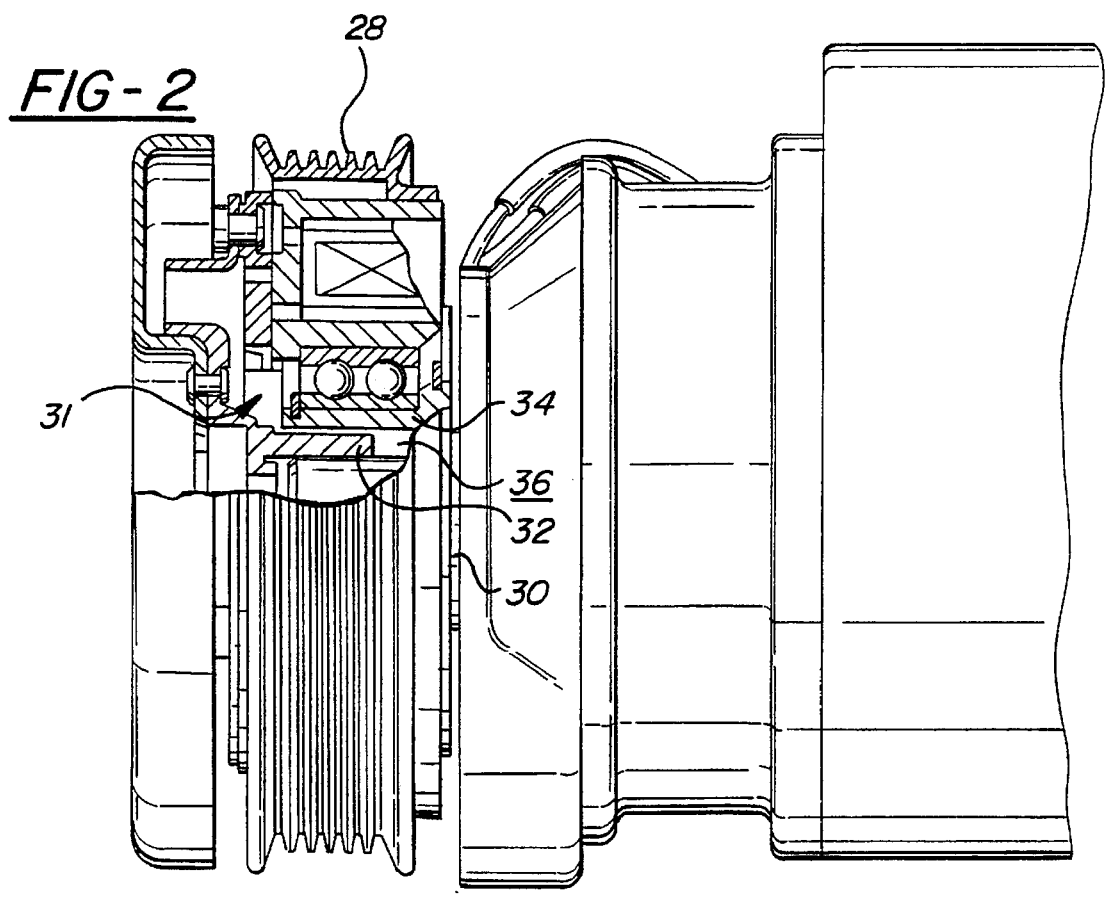
FIG. 2 is a sectional view of an air conditioning motor and clutch assembly of the internal combustion engine of FIG. 1.

FIG. 2 is a representative embodiment of an air conditioning motor 24. The air conditioning motor 24 includes a belt pulley 28 which has a continuous belt (not shown) wrapped therearound wherein the continuous belt is rotated by the internal combustion engine 10. The belt pulley 28 rotates an armature 32 which is in spaced relation with a rotor 34. This space 36 between the armature 32 and the rotor 34 is defined by an air gap width, the perpendicular distance between the armature 32 and the rotor 34. When a signal is received from the control unit 20, the armature 32 moves to engage the rotor 34. Once the armature 32 and the rotor are engaged, the air conditioning motor creates a load on the internal combustion engine 10 by using some of the power created by the internal combustion engine 10 to operate the air conditioning motor 24 to cool the occupant compartment of the automotive vehicle.

Figure 3:
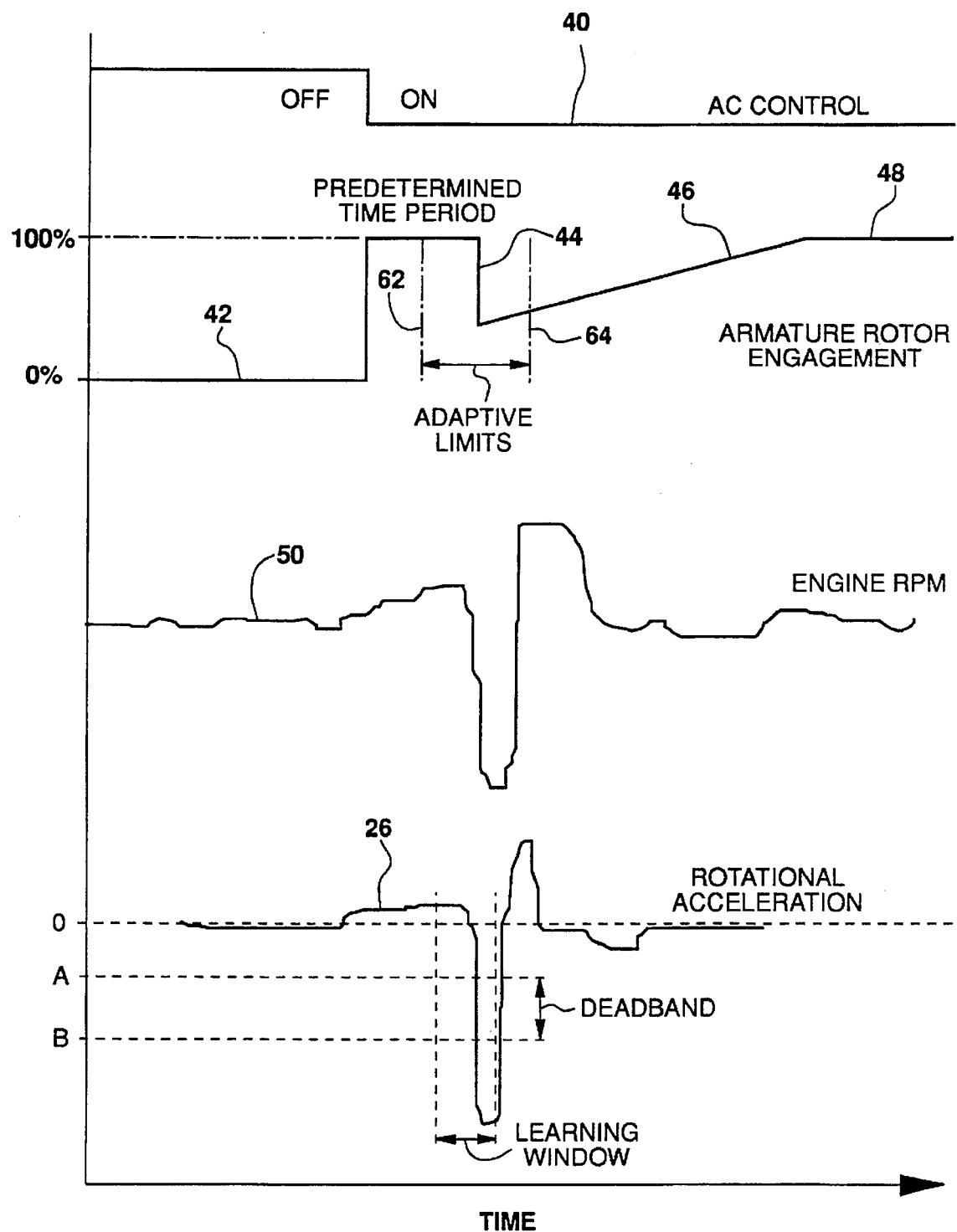
FIG. 3 is a graphic representation of outputs of the internal combustion engine and the air conditioning clutch as a function of time.

Referring to FIG. 3, a graph represents different events which occur as a function of time. At the top of the graph, the air conditioning control signal is indicated by line 40 wherein a low signal represents the air conditioner motor 24 is to be turned on. A high signal represents the air conditioner is to remain off. Although the signal 40 is represented digitally, an analog signal may also be suitable. The duty cycle in which the armature 32 engages the rotor 34 is represented by line 42. When the air conditioning motor 24 is turned off, the duty cycle is zero percent (0%). More specifically, the armature 32 engages the rotor 34 at no time when the air conditioning motor 24 is turned off. The duty cycle 42 quickly approaches one hundred percent (100%) when the air conditioning control signal 40 signals an on state. Therefore, initially when the air conditioning control signal 40 turns on, the duty cycle in which the armature 32 engages the rotor 34 is one hundred percent (100%). This full engagement forces the armature 32 to bridge the air gap 36 reducing the air gap width to zero quickly.

Once the air gap 36 is reduced to zero, a duty cycle drops from one hundred percent (100%) to a percentage between zero percent (0%) and one hundred percent (100%). This drop, represented by line segment 44 occurs at a time predicted that the armature 32 first engages the rotor 34. More specifically, the duty cycle drops from unity when it has been calculated that the rotor 34 and the armature 32 are to physically engage. By reducing the duty cycle, the load on the internal combustion engine 10 is reduced because the armature 32 is only engaging the rotor 34 and, hence, the air conditioning motor 24, for short intervals of time. The duty cycle is gradually ramped up, or increased, as represented by line segment 46, until the duty cycle reaches unity, one hundred percent (100%) as represented by line segment 48.

The revolutions per minute (RPM) of the internal combustion engine 10 is graphically represented with line 50 in FIG. 3. The RPM drop drastically when the armature 32 engages the rotor 34. The rotational acceleration 26 also drops when the armature 32 first engages the rotor 34. The rotational acceleration 26 is defined as the second derivative of piston location as a function of time. The rotational acceleration 26 will be discussed in greater detail subsequently.

Figure 4A:
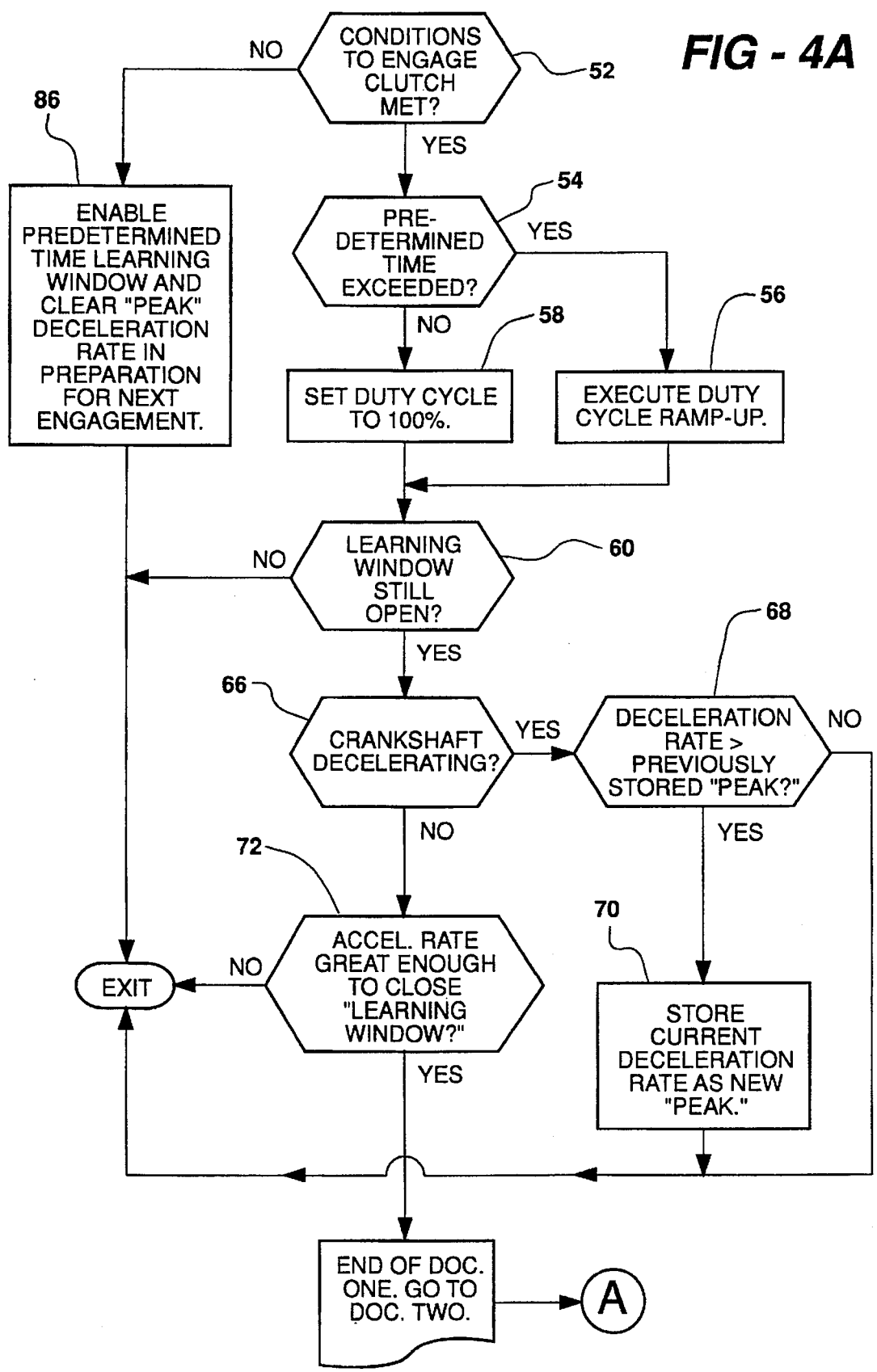
FIGS. 4A and 4B are portions of a flow chart of the method used to control the clutch assembly.
Figure 4B:
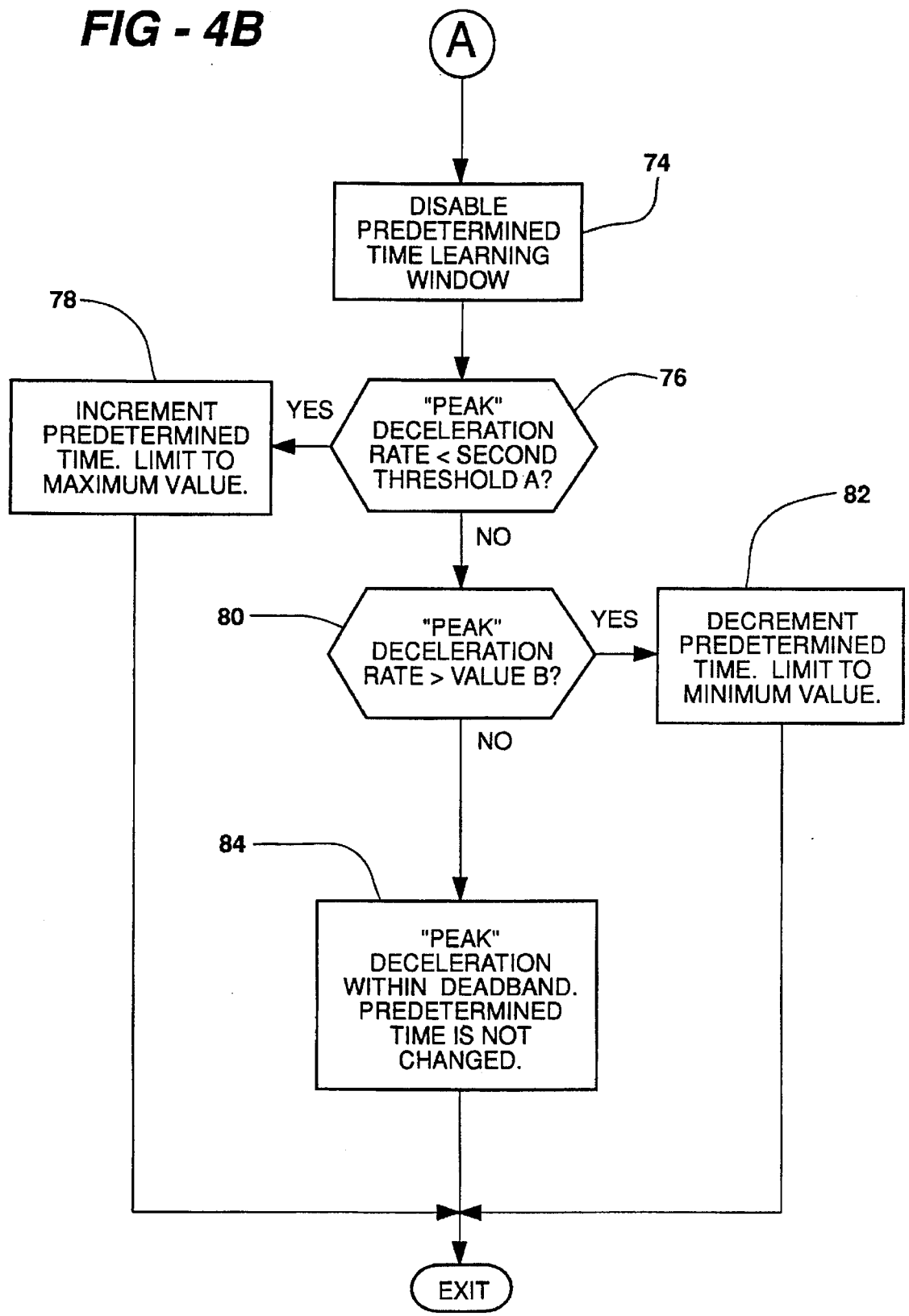

The method for controlling the clutch 31 of a load, such as an electric motor, is graphically represented by a flowchart in FIGS. 4A and 4B. In this embodiment, the clutch 31 is a clutch for an air conditioning motor 24. It will be appreciated by those skilled in the art to utilize this method for other clutches used in conjunction with other types of loads. The load receives power from a power source. In this embodiment, the power source is the internal combustion engine 10. The method includes the steps of receiving a signal to engage the clutch 31. This signal may be created by an on switch or by a temperature sensor which is used to determine the temperature of the occupant compartment of the automotive vehicle.

The armature 32 is moved to the rotor 34 over a predetermined time to reduce the air gap width located therebetween to zero. The power source, namely the internal combustion engine 10, is measured to determine the changes therein. The predetermined time is changed such that the changes in the internal combustion engine 10 are changed. The method also includes the step of removing the full magnetic force between the armature 32 and the rotor 34 after the predetermined time has elapsed. The armature 32 is then allowed to slip against the rotor 34 at a duty cycle less than unity, one hundred percent (100%). The duty cycle is then increased to unity over an extended time which is greater than the predetermined time gradually decreasing the slip to zero.

The predetermined time is reduced when the changes in the internal combustion engine 10 exceed a first threshold. More specifically, when the sensor 22 determines that the rotational acceleration of the crankshaft 18 has dropped below a low threshold (B in FIG. 3), the predetermined time in which the armature 32 is closing the air gap and engaging the rotor 34 is reduced. Conversely, the predetermined time is increased when the changes in the rotational acceleration of the crankshaft 18 do not reach a second high threshold (A in FIG. 3) wherein the second high threshold A is greater than the low threshold B. The absolute value of the second high threshold is less than the absolute value of the low threshold. More specifically, the predetermined time in which the armature 32 engages the rotor 34 is increased because the reduction in the rotational acceleration of the crankshaft 18 is so minimal that excess wear and tear on the armature 32 will occur when no reduction in a power drain is perceived.

Discussing the method in more detail, the control unit 20 determines whether conditions exist in which to engage the clutch at 52. The control unit 20 determines whether the predetermined time has exceeded at 54. If so, the duty cycle is ramped or increased at 56. If, however, the predetermined time has not been exceeded, the control unit 20 sets the duty cycle to one hundred percent (100%) at 58. It is then determined at 60 whether the adaptive learning window is still open (e.g., crankshaft 18 decelerating). A peak deceleration rate is measured during the learning window time period. The peak deceleration is used to decide whether to increase or decrease the predetermined time. If the adaptive learning window is not open, the method is exited. If the adaptive learning window exceeds the adaptive time limits, it is determined whether the crankshaft 18 is decelerating at 66. If the crankshaft 18 is decelerating, it is determined at 68 whether the deceleration rate is greater than the previously stored peak deceleration rate. If not, the method is stopped. If so, the deceleration rate is stored as the new peak deceleration rate and the method is stopped. If the crankshaft 18 is not decelerating, it is determined whether the acceleration rate is great enough to close the adaptive limits. If the acceleration rate has not exceeded this threshold, the method is stopped. If the acceleration rate is great enough to close the adaptive limits, at 72, the adaptive limits are closed at 74.

At this time the peak deceleration rate has been determined for this particular engagement of the clutch 31. It is then determined whether the peak deceleration rate is less than the second high threshold A. If it is, the predetermined time is incremented to a point not exceeding the maximum value 64. Block 78 represents the incrementation. Once the incrementation takes place the method is terminated. If the peak deceleration is determined not to be less than the second high threshold at 76, the peak deceleration rate is measured against the low value B at 80. If the peak deceleration rate is greater than the low value, the predetermined time will be decremented or reduced at 82 to a value which will not be lower than the minimum value 62. If the peak deceleration rate is not greater than the low threshold B, it is determined at 84 whether the peak deceleration rate is within the deadband established by the two thresholds A, B. If the peak deceleration rate is measured to be between the two thresholds A, B, the predetermined time period is satisfactory. The predetermined time period in this instance will not be changed. If, referring to diamond 52, the condition to engage the clutch 31 is not met, the adaptive limits are maximized and the peak deceleration rate is cleared in preparation for the next clutch engagement.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims the present invention may be practiced otherwise than as specifically described.

What is claimed is:

1. A method for controlling a clutch of load receiving power from a power source, the clutch having a rotor and an armature separated by an air gap width, the method comprising the steps of:

receiving a signal to engage the clutch;

moving the armature to the rotor over a predetermined time to reduce the air gap width to zero;

measuring a change in rotational acceleration in the power source; and changing the predetermined time such that the chance in rotational acceleration in the power source is reduced.

2. A method as set forth in claim 1 including the step of slipping the armature with respect to the rotor after the predetermined time elapses.

3. A method as set forth in claim 2 including the step of engaging the armature with the rotor for duty cycle less than unity.

4. A method as set forth in claim 3 including the step of increasing the duty cycle to unity over an extended time greater than the predetermined time.

5. A method as set forth in claim 4 including the step of reducing the predetermined time when the changes in the power source exceed a low threshold.

6. A method as set forth in claim 5 including the step of increasing the predetermined time when the changes in the power source do not reach a second high threshold, the second high threshold being less than the first threshold.

7. A method for controlling a clutch for an air conditioning compressor receiving power from an internal combustion engine having a crankshaft, the clutch including an armature and a rotor separated by an air gap width, the method comprising the steps of:

receiving a signal to engage the clutch;

moving the armature to the rotor over a predetermined time to reduce the air gap width to zero;

measuring rotational acceleration of the crankshaft of the internal combustion engine; and changing the predetermined time the armature abuts the rotor such that subsequent movement of the armature reduces the changes in the rotational acceleration of the crankshaft.

8. A method for controlling a clutch for an air conditioning compressor receiving power from an internal combustion engine having a crankshaft, a clutch including an armature and a rotor separated by an air gap width, the method comprising the steps of:

receiving the signal to engage the clutch;

moving the armature to the rotor over a predetermined time to reduce the air gap width to zero;

measuring the rotational acceleration of the crankshaft of the internal combustion engine;

comparing the rotational acceleration to a low threshold;

reducing the predetermined time the armature abuts the rotor when the rotational acceleration exceeds the low threshold; comparing the rotational acceleration of the crankshaft to a second high threshold; and increasing the predetermined time the armature abuts the rotor when the rotational acceleration does not exceed the second high threshold.

* * * * *